(12) United States Patent
Siegel et al.

(10) Patent No.: US 12,493,363 B2
(45) Date of Patent: Dec. 9, 2025

(54) SYSTEM AND METHOD FOR AN ELECTRONIC SIGNATURE DEVICE

(71) Applicants: Jonathan Siegel, Beaverton, OR (US); James Weisser, Beaverton, OR (US)

(72) Inventors: Jonathan Siegel, Beaverton, OR (US); James Weisser, Beaverton, OR (US)

( * ) Notice: Subject to any disclaimer, the term of this patent is extended or adjusted under 35 U.S.C. 154(b) by 0 days.

(21) Appl. No.: 17/979,804

(22) Filed: Nov. 3, 2022

(65) Prior Publication Data

US 2023/0059465 A1     Feb. 23, 2023

Related U.S. Application Data

(63) Continuation-in-part of application No. 17/729,010, filed on Apr. 26, 2022, now abandoned, which is a
(Continued)

(51) Int. Cl.
*G06F 3/0346*     (2013.01)
*G06F 3/0488*     (2022.01)
(Continued)

(52) U.S. Cl.
CPC .......... *G06F 3/0346* (2013.01); *G06F 3/0488* (2013.01); *G06F 21/64* (2013.01); *G06F 21/32* (2013.01); *G06Q 10/10* (2013.01)

(58) Field of Classification Search
None
See application file for complete search history.

(56) References Cited

U.S. PATENT DOCUMENTS

| 5,748,738 | A | 5/1998 | Bisbee |
| 5,898,156 | A | 4/1999 | Wilfong |

(Continued)

FOREIGN PATENT DOCUMENTS

| CN | 1635533 A | 7/2005 |
| CN | 101931631 B | 8/2013 |

(Continued)

OTHER PUBLICATIONS

Afteracademy, What are Gateways (previously provided) (Year: 2020).*
(Continued)

*Primary Examiner* — Matthew Ell
*Assistant Examiner* — Gabriel Mercado
(74) *Attorney, Agent, or Firm* — GRAESER ASSOCIATES INTERNATIONAL INC; Dvorah Graeser

(57) ABSTRACT

An electronic stamp device, embodied in a physical object, which is secure and which is able to provide a verifiable electronic signature. The electronic stamp device comprises a touchpoint detection technology for detecting a plurality of touchpoints when the device is applied to a document, whether electronic or physical. The touchpoint detection technology may for example comprise any suitable sensor or combination thereof, including but not limited to an accelerometer, a gyroscope, a magnetometer or an IMU (inertial measurement unit), a pressure sensor, or a combination thereof. The accelerometer may comprise a 3D accelerometer. The gyroscope may comprise a 3D gyroscope. An IMU includes an accelerometer and a gyroscope. A plurality of such sensors may also be provided.

22 Claims, 16 Drawing Sheets

Related U.S. Application Data continuation of application No. 17/168,280, filed on Feb. 5, 2021, now abandoned.

(51) Int. Cl.
*G06F 21/64* (2013.01)
*G06F 21/32* (2013.01)
*G06Q 10/10* (2023.01)

(56) References Cited

U.S. PATENT DOCUMENTS

| | | | |
|---|---|---|---|
| 6,601,172 B1 | 7/2003 | Epstein | |
| 6,640,007 B1* | 10/2003 | Niie | G06F 3/03545 345/157 |
| 7,096,365 B1 | 8/2006 | Hamann | |
| 7,770,009 B2 | 8/2010 | Miyazaki | |
| 8,041,952 B2 | 10/2011 | Parry | |
| 8,271,791 B2 | 9/2012 | Buhler | |
| 8,370,632 B2 | 2/2013 | Lehwany | |
| 8,924,307 B2 | 12/2014 | Han | |
| 9,369,287 B1 | 6/2016 | Sarvestani | |
| 9,954,683 B2 | 4/2018 | Ali | |
| 2004/0140956 A1* | 7/2004 | Kushler | G06F 3/04883 345/168 |
| 2005/0039018 A1 | 2/2005 | Wittkotter | |
| 2007/0271463 A1* | 11/2007 | Ginter | H04N 21/25875 713/176 |
| 2009/0235082 A1* | 9/2009 | Garrett | H04L 9/3231 713/176 |
| 2011/0185180 A1 | 7/2011 | Gullberg | |
| 2012/0331546 A1* | 12/2012 | Falkenburg | G06T 11/001 726/16 |
| 2013/0045774 A1* | 2/2013 | Arat | G06F 3/03545 455/556.1 |
| 2013/0106731 A1 | 5/2013 | Yilmaz | |
| 2014/0267425 A1* | 9/2014 | Moll | G06T 11/60 345/638 |
| 2016/0011013 A1* | 1/2016 | Pedrotti | G01C 25/00 702/89 |
| 2016/0078277 A1 | 3/2016 | Sprigg | |
| 2016/0191251 A1* | 6/2016 | Alkhalaf | H04L 9/3247 713/176 |
| 2016/0275279 A1* | 9/2016 | Kunieda | G06F 21/32 |
| 2017/0341446 A1* | 11/2017 | Almutairi | G06V 40/13 |
| 2017/0344251 A1* | 11/2017 | Hajimusa | G06Q 20/20 |
| 2018/0107296 A1* | 4/2018 | Uenishi | G06F 3/0488 |
| 2018/0247151 A1* | 8/2018 | Talyansky | G06F 16/5838 |
| 2018/0316509 A1* | 11/2018 | Gardner | H04L 9/3247 |
| 2019/0342676 A1 | 11/2019 | Wurzbacher | |
| 2020/0209991 A1* | 7/2020 | Wong | G06F 3/0346 |
| 2022/0086218 A1* | 3/2022 | Sabella | H04M 15/66 |
| 2023/0083911 A1 | 3/2023 | Siegel | |

FOREIGN PATENT DOCUMENTS

| | | |
|---|---|---|
| CN | 106330459 A | 1/2017 |
| EP | 1280098 A1 | 1/2003 |
| EP | 1704667 B1 | 2/2010 |
| JP | 2005311545 A | 11/2005 |
| JP | 4505251 B2 | 7/2010 |
| JP | 4505253 B2 | 7/2010 |
| JP | 5768543 B2 | 8/2015 |
| WO | 2004068264 | 8/2004 |
| WO | 2007048159 A2 | 5/2007 |
| WO | 2016083917 A1 | 6/2016 |

OTHER PUBLICATIONS

Techtarget, Native App Definition from WhatIs, Jan. 26, 2021 (previously provided) (Year: 2021).*
Brown, Patrick W. "Digital signatures: are they legal for electronic commerce?." IEEE Communications Magazine 32.9 (1994): 76-80.
Elfadil, Nazar. "Graphical and Digital signature Combination for fulfilling the cultural gap between traditional signature and current smart card digital certificate/signature." PST. 2005.
Gillis—Native App Definition from WhatIs (Year: 2020).
Liu, Vicky, et al. "Visually sealed and digitally signed documents." Computer Science 2004. Proceedings of the Twenty-Seventh Australasian Computer Science Conference (ACSC2004). Australian Computer Society, 2004.
Mana, Antonio, and Sonia Matamoros. "Practical Mobile Digital Signatures." International Conference on Electronic Commerce and Web Technologies. Berlin, Heidelberg: Springer Berlin Heidelberg, 2002.
US Office Action issued in U.S. Appl. No. 17/168,280, dated Oct. 29, 2021, 34 pages.

* cited by examiner

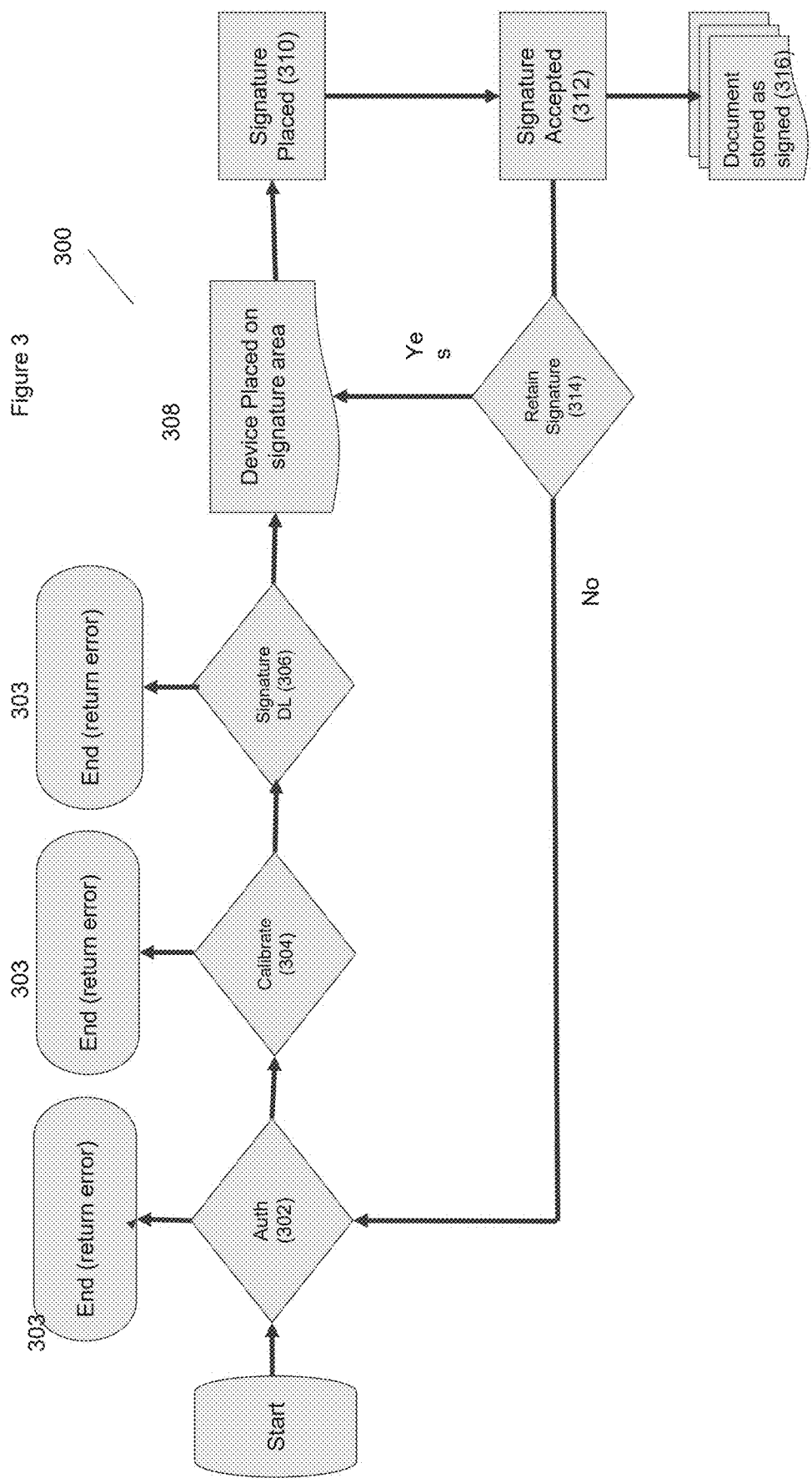

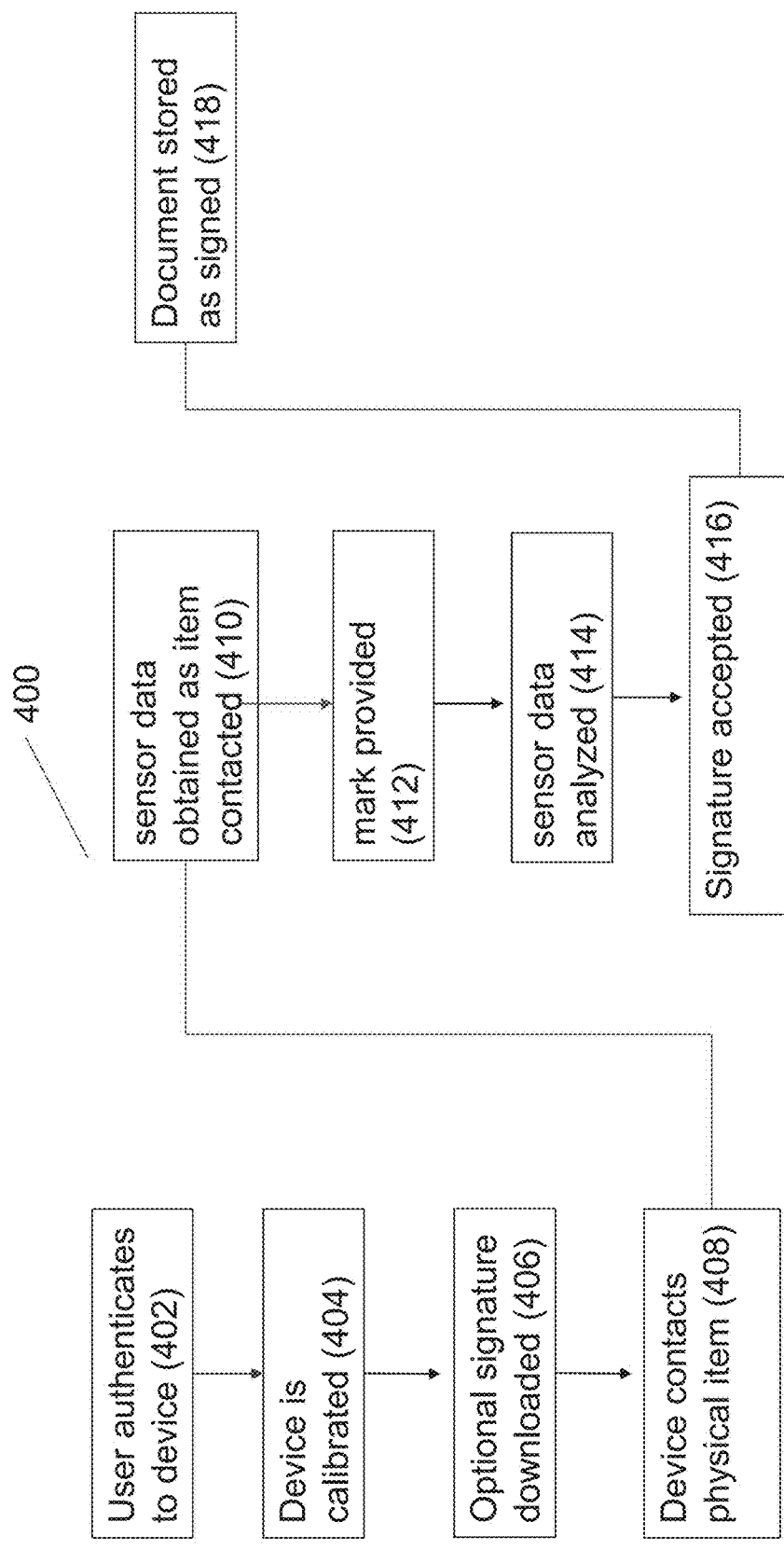

SYSTEM AND METHOD FOR AN ELECTRONIC SIGNATURE DEVICE

FIELD OF THE INVENTION

The present invention relates generally to a system and method for electronic signatures, and more specifically to such a system and method for electronic signatures with a physical device.

BACKGROUND

Physical signatures, for example for indicating authorization of or assent to a document and/or action, may take many forms. Many countries have traditionally used handwritten signatures as binding indications of authorization or assent, whether for individuals or companies. In the case of companies, the handwritten signature would be provided by an individual who is authorized to sign on behalf of the company.

In other countries, the use of a physical device with a stamp is traditionally used in place of handwritten signatures. The physical device, known in Japan as a "hanko" (and by other names depending upon what it represents and how it is registered and in other locales as a "chop" replaces a signature in many or all cases. The physical device with the stamp may be used to indicate authorization or assent for individuals or companies. In the case of companies, an additional complication arises in that revocation of an individual's authority to bind the company may be difficult or impossible if that individual retains the company's physical signature device(s). Further, these physical devices while they may be unique in specific physical ways (character styles, spacing etc.) require substantial action to revoke. Because the stamp itself is legally binding, revocation is quite difficult. If the stamp is stolen or misused it can create substantial liability for the company or the individual.

Various solutions have been considered for electronic devices to replace the physical devices. However, these solutions suffer from a variety of deficiencies. In particular, these solutions generally require a special electronic device to act as the surface for receiving the signature, in addition to the electronic stamp or "chop"/"hanko" physical signature device and fail to address the need to revoke a hanko in the event it is obtained by an unauthorized individual.

SUMMARY

The background art does not teach or suggest an electronic stamp device, embodied in a physical object, which is secure yet is able to provide an electronic signature without requiring an additional electronic device. Indeed, the background art frequently requires a biometric device, which has its own drawbacks and limitations, in addition to complicating the use of the electronic stamp device. The background art also does not teach or suggest such an electronic stamp device which uses touchpoint detection on a screen, video identification or unique, document level marking, or a combination thereof, for providing additional security for electronic signatures. The background art does not recognize the benefits of including wireless connectivity, cryptographic authentication/revocation, pressure sensors or piezoelectric actuators, motors and other nanoscale mechanical devices. Further, it does not recognize the benefit of being able to identify the physical location and/or integrate with third party document authorities for validation, separate from or integral to the server network.

The present invention, in at least some embodiments, provides an electronic stamp device, embodied in a physical object, which is secure and which is able to provide a verifiable electronic signature. The electronic stamp device comprises a touchpoint detection technology for detecting a plurality of touchpoints when the device is applied to a document, whether electronic or physical. The touchpoint detection technology may for example comprise any suitable sensor or combination thereof, including but not limited to an accelerometer, a gyroscope, a magnetometer or an IMU (inertial measurement unit), a pressure sensor, or a combination thereof. The accelerometer may comprise a 3D accelerometer. The gyroscope may comprise a 3D gyroscope. An IMU includes an accelerometer and a gyroscope. A plurality of such sensors may also be provided. Further, the device may be able to leave an imprint on the physical or electronic document which is unique to the document through use of actuators or other nanoscale mechanical devices, optionally utilizing cryptographic or other secure methods.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Unless otherwise defined, all technical and scientific terms used herein have the same meaning as commonly understood by one of ordinary skill in the art to which this invention belongs. The materials, methods, and examples provided herein are illustrative only and not intended to be limiting.

An algorithm as described herein may refer to any series of functions, steps, one or more methods or one or more processes, for example for performing data analysis.

Implementation of the apparatuses, devices, methods and systems of the present disclosure involve performing or completing certain selected tasks or steps manually, automatically, or a combination thereof. Specifically, several selected steps can be implemented by hardware or by software on an operating system, of a firmware, and/or a combination thereof. For example, as hardware, selected steps of at least some embodiments of the disclosure can be implemented as a chip or circuit (e.g., ASIC). As software, selected steps of at least some embodiments of the disclosure can be implemented as a number of software instructions being executed by a computer (e.g., a processor of the computer) using an operating system. In any case, selected steps of methods of at least some embodiments of the disclosure can be described as being performed by a processor, such as a computing platform for executing a plurality of instructions. The processor is configured to execute a predefined set of operations in response to receiving a corresponding instruction selected from a predefined native instruction set of codes.

Software (e.g., an application, computer instructions) which is configured to perform (or cause to be performed) certain functionality may also be referred to as a "module" for performing that functionality, and also may be referred to a "processor" for performing such functionality. Thus, a processor, according to some embodiments, may be a hardware component, or, according to some embodiments, a software component.

Optionally, in addition to the above software module, cryptographic hardware/software may also be included as a "security module", for example as an additional element for clarity which manages some or all of the key elements of authentication, identification (of the device, the document, the individual and the purpose) and/or for other reasons.

Further to this end, in some embodiments: a processor may also be referred to as a module; in some embodiments, a processor may comprise one or more modules; in some embodiments, a module may comprise computer instructions-which can be a set of instructions, an application, software-which are operable on a computational device (e.g., a processor) to cause the computational device to conduct and/or achieve one or more specific functionality.

Some embodiments are described with regard to a "computer," a "computer network," and/or a "computer operational on a computer network." It is noted that any device featuring a processor (which may be referred to as "data processor"; "pre-processor" may also be referred to as "processor") and the ability to execute one or more instructions may be described as a computer, a computational device, and a processor (e.g., see above), including but not limited to a personal computer (PC), a server, a cellular telephone, an IP telephone, a smart phone, a PDA (personal digital assistant), a thin client, a mobile communication device, a smart watch, head mounted display or other wearable that is able to communicate externally, a virtual or cloud based processor, a pager, and/or a similar device. Two or more of such devices in communication with each other may be a "computer network." The accompanying figures include multiple cases of "computer networks" and other types of communication networks.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention.

In this regard, no attempt is made to show structural details of the invention in more detail than is necessary for a fundamental understanding of the invention, the description taken with the drawings making apparent to those skilled in the art how the several forms of the invention may be embodied in practice. These and other features, aspects, and advantages of the present invention will become better understood with regard to the following description, appended claims, and accompanying drawings where:

FIG. 3 shows a non-limiting exemplary flow for enabling the user to authenticate to the electronic signature device and then to sign a document.

FIG. 4 shows another non-limiting exemplary flow with additional details in regard to operation of the electronic signature device.

DETAIL DESCRIPTION OF THE INVENTION

In describing the novel system and method for a secure electronic signature device, the provided examples should not be deemed to be exhaustive. While one implementation is described hereto, it is to be understood that over variations are possible without departing from the scope and the nature of the present invention.

The drawings show a system and method and at least some exemplary embodiments for an electronic signature device that is capable of signing documents in a variety of media including without limitation, paper or other solid media and digital media.

FIGS. 1A-1H show various non-limiting, exemplary embodiments of systems for an electronic signature device. Components with the same reference numbers have the same or at least similar function.

Figure 1A:
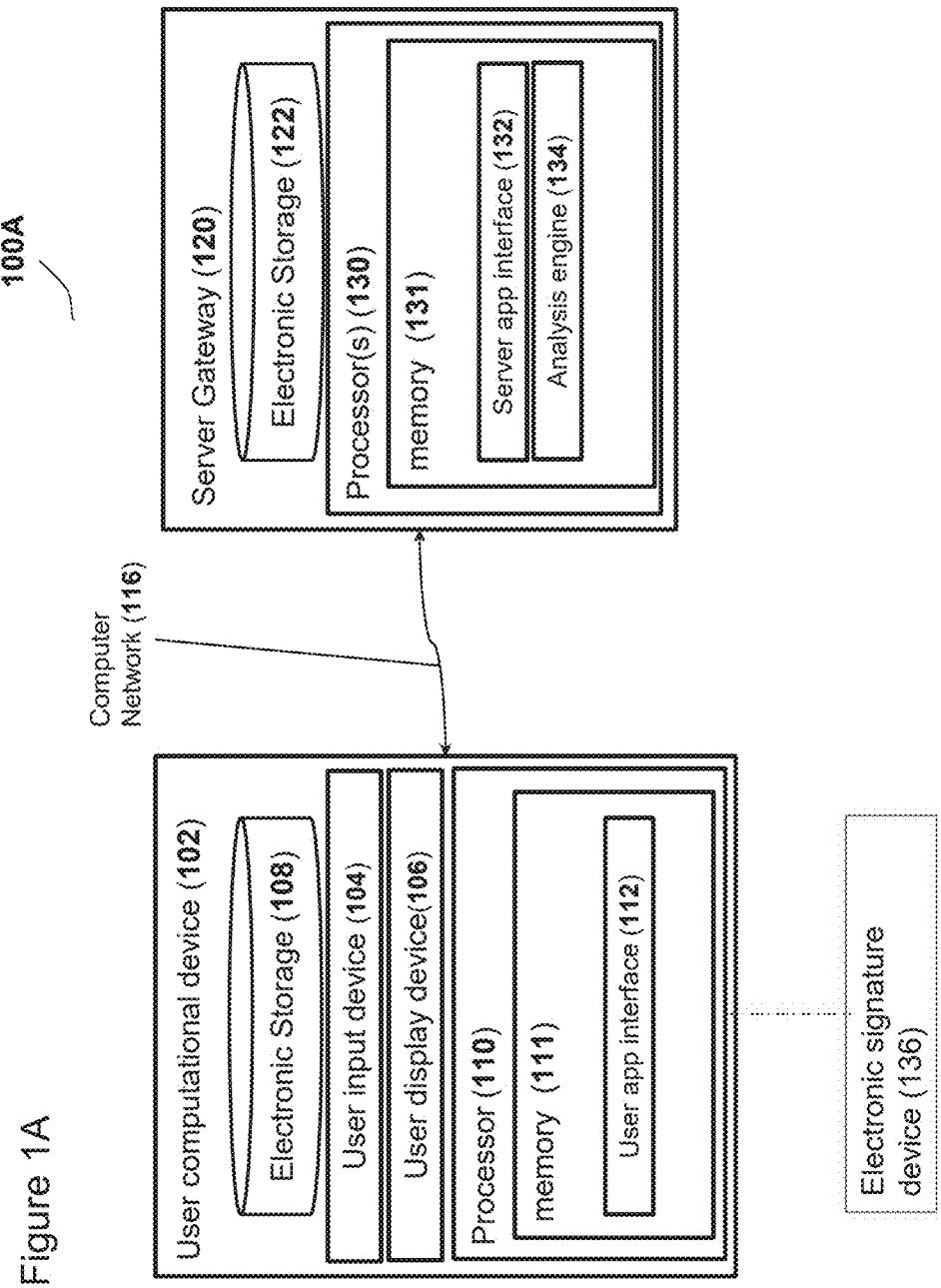
FIG. 1A shows a system for an electronic signature device according to at least some embodiments.

FIG. 1A shows a system for an electronic signature device according to at least some embodiments. As shown in FIG. 1A, the system 100 comprises a user computational device 102, a server gateway 112, and an electronic signature device 136. The user computational device 102 and the server gateway 120 preferably communicate through a computer network 116.

The user computational device 102 features electronic storage 108 for storing information and data, including without limitation one or more programs or computer information. The user computational device 102 also comprises a user input device 104, user display device 106, a processor 110, and computer readable instructions stored in a memory 111. Computer readable instructions comprise instructions for operating user computational device 102 including without limitation user app interface 112. User computational device 102 is in communication with electronic signature device 136, where such communication may be direct wire communication, or alternatively wireless communication. Optionally and preferably, such communication is through real-time network connectivity.

The electronic signature device 136 enables the user to sign a document, whether on a solid media or physical media such as paper, or alternatively on a digital media such as a touch screen. Optionally and alternatively or additionally, the document is present in a virtual environment, such as virtual reality or augmented reality, for example as referred to as the metaverse. As the user signs the document through the electronic signature device 136, the electronic signature device 136 communicates information to the user computational device 102, where the information includes without limitation the location of the signature, user authentication, and optionally also pressure or other sensor indications that in fact, the document has been signed.

The electronic signature device 136 may operate, for example, in the form of a chop or hanko, where the act of the user pressing the electronic signature device 136 to a document—whether on a physical media, or solid media such as paper, or a digital media—indicates that the document has in fact been signed. Optionally, the electronic signature device 136 requires a user authentication, whether the authentication is through the device itself, or alternatively through user computational device 102. Optionally, the user may choose to download a hanko or chop signature indication to the electronic signature device 136 through the user computational device 102.

Alternatively, the electronic signature device 136 may come with a single hanko or chop preloaded, which is then enabled for the user to operate. Optionally, however, such authorization is required to be renewed before the signature can be accepted. For example, if the user no longer has authorization to use a particular hanko or chop insignia, then the electronic signature device 136 no longer has the authorization and is no longer operative, at least with regard to that particular form of chop or hanko. Information from the electronic signature device 136 is communicated to the user computational device 102 and then is communicated to the server gateway 120 through the computer network 116.

The server gateway 120 comprises an electronic storage 122, a processor 130, and machine readable instructions stored in a memory 131. The machine readable instructions include instructions for executing a server app interface 132 for communicating to and receiving information from the user computational device 102. The machine readable instructions also preferably include instructions for operating an analysis engine 134, for example, for supporting authentication of the user and/or electronic signature device 136.

Functions of processor 110 preferably relate to those performed by any suitable computational processor, which generally refers to a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory, such as memory 111 in this non-limiting example. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Also optionally, memory 111 is configured for storing a defined native instruction set of codes. Processor 110 is configured to perform a defined set of basic operations in response to receiving a corresponding basic instruction selected from the defined native instruction set of codes stored in memory 111. For example and without limitation, memory 111 may store a first set of machine codes selected from the native instruction set for receiving document information from the user through user app interface 112 and a second set of machine codes selected from the native instruction set for transmitting such information to server gateway 120 in regard to a document for signature. Optionally, electronic device 136 communicates with user computational device 102, such that memory 111 stores a third set of machine codes selected from the native instruction set for transmitting electronic signature authorization in regard to the specific document to be signed.

Optionally and preferably, memory 111 stores a fourth set of machine codes selected from the native instruction set for receiving touchpoint detection data from electronic device 136, and a fifth set of machine codes selected from the native instruction set for transmitting such touchpoint detection data to server gateway 120.

In regard to the touchpoint detection data, preferably electronic device 136 comprises a suitable touchpoint detection technology for detecting a plurality of touchpoints. The touchpoint detection technology may for example comprise any suitable sensor or combination thereof, including but not limited to an accelerometer, a gyroscope, a magnetometer or an IMU (inertial measurement unit), a pressure sensor, or a combination thereof. The accelerometer may comprise a 3D accelerometer. The gyroscope may comprise a 3D gyroscope. An IMU includes an accelerometer and a gyroscope. A plurality of such sensors may also be provided. The touchpoint detection technology preferably is also able to detect an order and/or relative location of the touchpoints, and/or relative rate at which the touchpoints are created as electronic device 136 is brought into contact with the document to be signed.

Similarly, server gateway 120 preferably comprises processor 130 and memory 131 with machine readable instructions with related or at least similar functions, including without limitation functions of server gateway 120 as described herein. For example and without limitation, memory 131 may store a first set of machine codes selected from the native instruction set for receiving document information from user computational device 102, a second set of machine codes selected from the native instruction set for receiving signature information from electronic signature device 136, whether directly or indirectly, and a third set of machine codes selected from the native instruction set for executing functions of analysis engine 134, including without limitation determining signature authorization and application to a particular document. The signature information preferably includes the touchpoint detection data from the touchpoint detection technology, which is then preferably analyzed by analysis engine 134 as part of the authorization process.

Figure 1B:
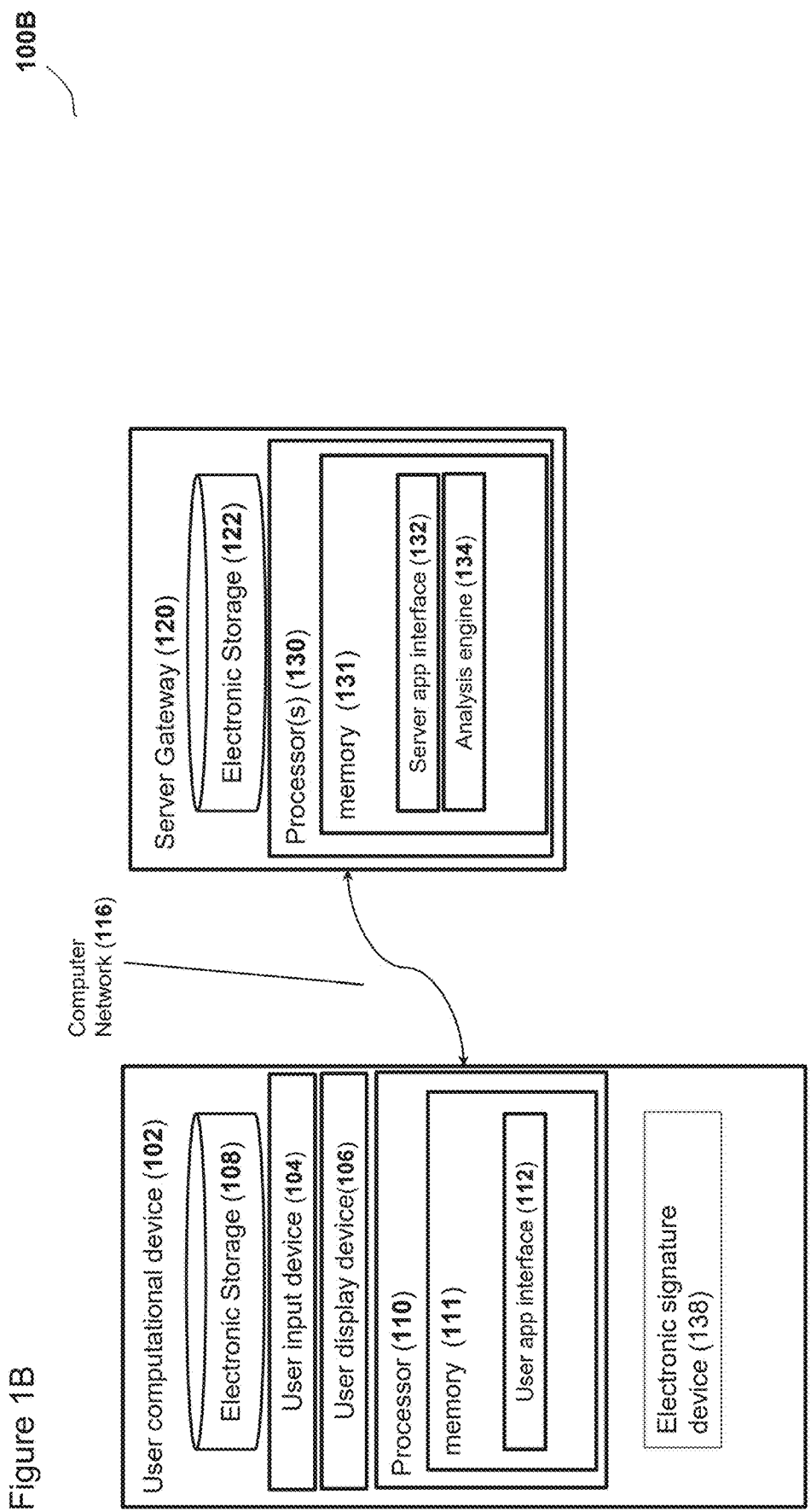
FIG. 1B shows an alternative embodiment of the system according to at least some embodiments.

FIG. 1B shows an alternative embodiment of a system according to at least some embodiments. The system 100B features an electronic signature device 138, which is integrally formed with or physically connected to a user computational device 102. The electronic signature device 138 may otherwise operate similarly to that of electronic signature device 136 as shown in FIG. 1A, but may, for example, form part of a mobile phone or may be attached to a mobile phone—as for example, a dongle or other direct attachment.

The electronic signature device 138 may also be connected with or integrally formed with a user computational device 102, which may for example be a laptop or a touchscreen enabled device like a tablet or smartphone.

The electronic signature device 138 preferably features the same or similar technology as described for FIG. 1A, for example in regard to the touchpoint detection technology, such as with regard to the sensors for example. The previously described instructions stored in memory 111 preferably also comprise instructions for transmitting data, including but not limited to with regard to authorization and/or touchpoint detection data, to server gateway 120.

Figure 1C:
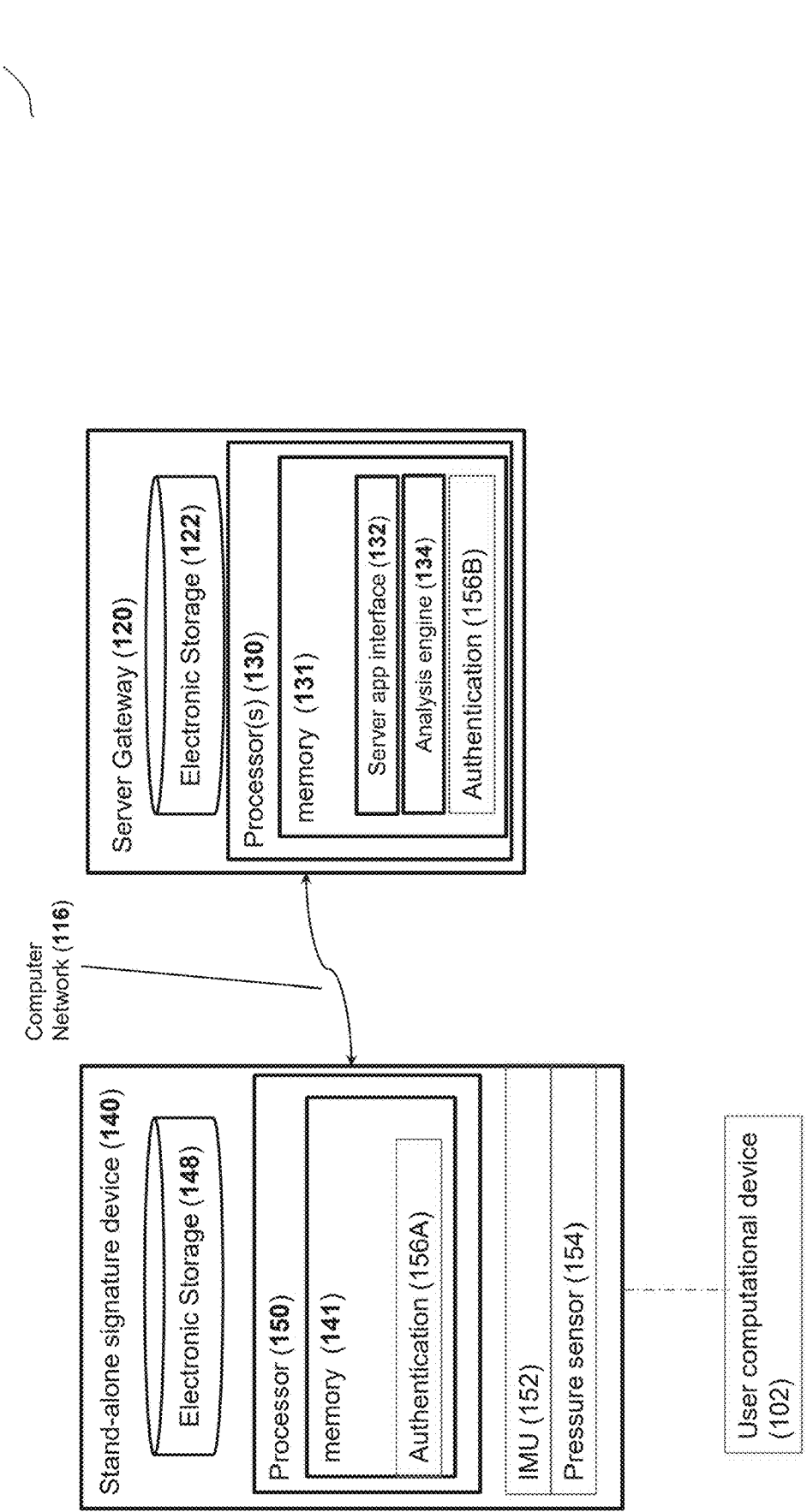
FIG. 1C shows another alternative embodiment of the system according to at least some embodiments.

FIG. 1C shows yet another alternative embodiment of the system, now shown as system 100C. As shown in system 100C, a standalone signature device 140 communicates directly with a server gateway 120 through a computer network 116. The standalone signature device 140 comprises many of the components as previously shown of the user computational device 102, including electronic storage 148, a processor 150, and computer readable instructions stored in a memory 141. The computer readable instructions in memory 141 now also preferably support authentication 156A at user computational device 102, for authenticating a user and/or for authenticating the signature or indication itself. The instructions preferably also comprise instructions for communicating authentication to server gateway 120. Server gateway 120 also preferably comprises authentication 156B, for supporting authentication, preferably through communication with user computational device 102 in regard to verified authentication through authentication 156A. Authentication 156A and 156B may feature, additionally or alternatively, encryption or other security features.

Authentication 156A may also act to authenticate standalone signature device 140 to the server gateway 120 so that the signature or other indicia are in fact accepted as being legitimate. The standalone signature device 140 also preferably comprises an inertial measurement unit (IMU) 152 and/or pressure sensor 154, which as previously described are non-limiting examples of touchpoint detection technology. The IMU 152 may be used, for example, to provide readings from an accelerometer, gyroscope and so forth to indicate the orientation of the standalone signature device 140 and also to indicate that a signature has actually occurred.

Additionally or alternatively, the pressure sensor 154 may indicate that the standalone signature device 140 has actually been pressed against a document, whether the document is in solid or physical form, such as paper, or alternatively, whether the document is in digital form. In either case, optionally, the user may be required to perform authentication through the user computational device 102 either because the electronic document is stored on user computational device 102 or, alternatively, because the user is required to provide authentication through the standalone signature device 140 through authentication module 156A, so that the user is authenticated and so that the signature or other indicia are accepted as being authentic. Document information may be transmitted directly from user computational device 102 to server gateway 120 (not shown) or may be transmitted to standalone signature device 140, and then to server gateway 120.

Preferably, standalone signature device 140 comprises instructions stored in memory 141 for touchpoint detection through processing data from the previously described IMU 152 and/or pressure sensor 154. As previously described, touchpoint detection may comprise detecting an order of touchpoints, an amount of pressure, a speed of touchpoint appearance and so forth. Such information may then be processed through authentication 156A and then transmitted to server gateway 120, for example to authentication 156B as described above.

Figure 1D:
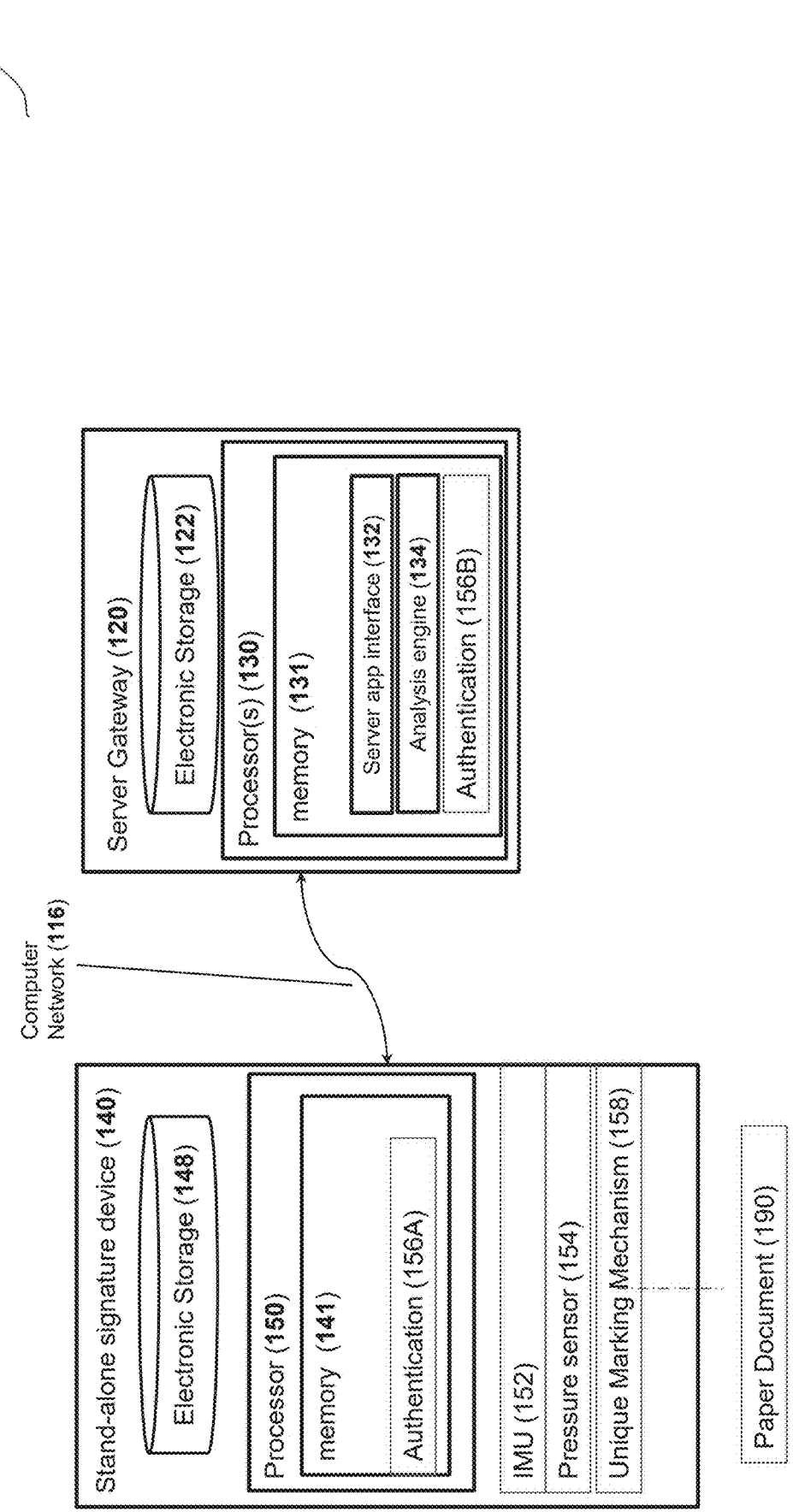
FIG. 1D shows another alternative embodiment of the system according to at least some of the embodiments.

FIG. 1D shows yet another alternative embodiment of the system, featuring the addition of a Unique Marking Mechanism 158, shown as system 100D. Unique marking mechanism supports addition of the signature to a physical, paper document 190. In this non-limiting example, unique marking mechanism 158 features a component for making a physical mark on the paper document 190, such as a traditional hanko or chop type image for example, as part of the signature process.

Unique Marking Mechanism 158 may be composed of a mix of mechatronic and microelectromechanical systems depending on the type of physical mark which is desired, including piezoelectric actuators, motors and other nanoscale mechanical devices. Unique Marking Mechanism 158 can also be used to generate a mark invisible to the naked eye and only visible in certain conditions, which would include but not be limited to ultraviolet or infrared light, or at certain temperatures.

Unique Marking Mechanism 158 may also comprise a remotely generated, machine readable instruction set in conjunction with or independently of a locally generated, device/time/date/document specific set of details to add a hanko or chop which is unique to the specific document. Such a machine readable instruction set may comprise an AI (artificial intelligence) model as described with regard to FIGS. 5A and 5B. Such a model may also be used in conjunction with electronic signature device 140, for example for authentication and verification of a user's identity, optionally in conjunction with authentication 156A and/or authentication 156B. Such an AI model may also be used for touchpoint detection.

Unique Marking Mechanism 158 may also feature cryptographic key storage, as part of storing the results of the chop or hanko, and/or the authentication of the user and/or of the chop or hanko. Unique Marking Mechanism 158 may also enable recording of the results of the operation of electronic signature device 140. The results may be recorded locally at electronic signature device 140, at server gateway 120 or both.

Figure 1E:
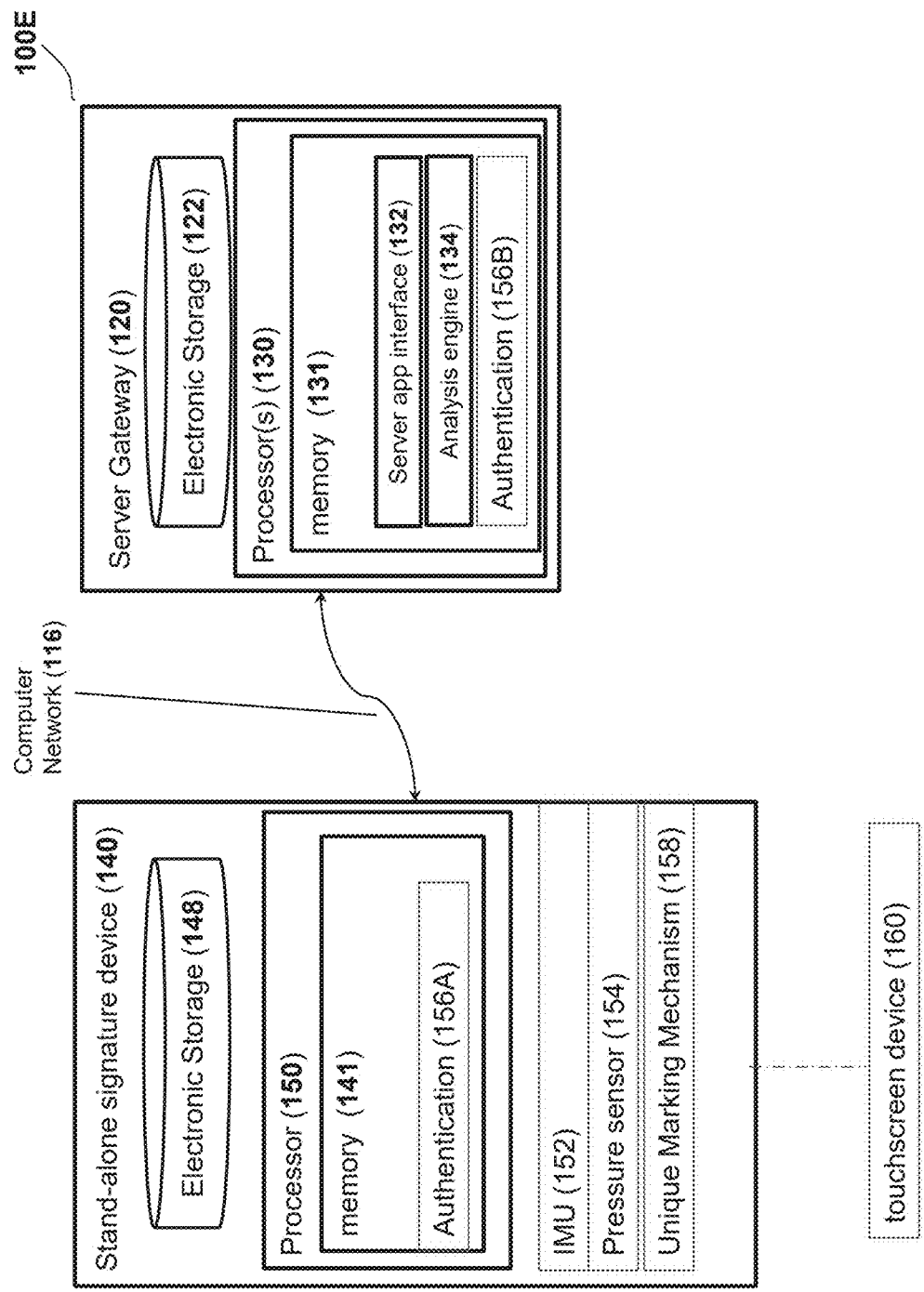
FIG. 1E shows another alternative embodiment of the system according to at least some of the embodiments.

FIG. 1E shows yet another alternative embodiment of the system, featuring operation of the unique marking mechanism in an embodiment that operates with a touch screen, shown as a system 100E. Unique Marking Mechanism 158 now supports physical contact with a touchscreen device 160. Unique Marking Mechanism 158 may feature for example a mechatronic and/or piezoelectric device that is able to place precise pressure at specific points on the touchscreen of touchscreen device 160, as described above. Unique Marking Mechanism 158 preferably does not make a physical mark by depositing ink for this embodiment. The previously described AI model may be used to analyze the touchpoints and pressure pattern made by Unique Marking Mechanism 158 on touchscreen device 160.

Figure 1F:
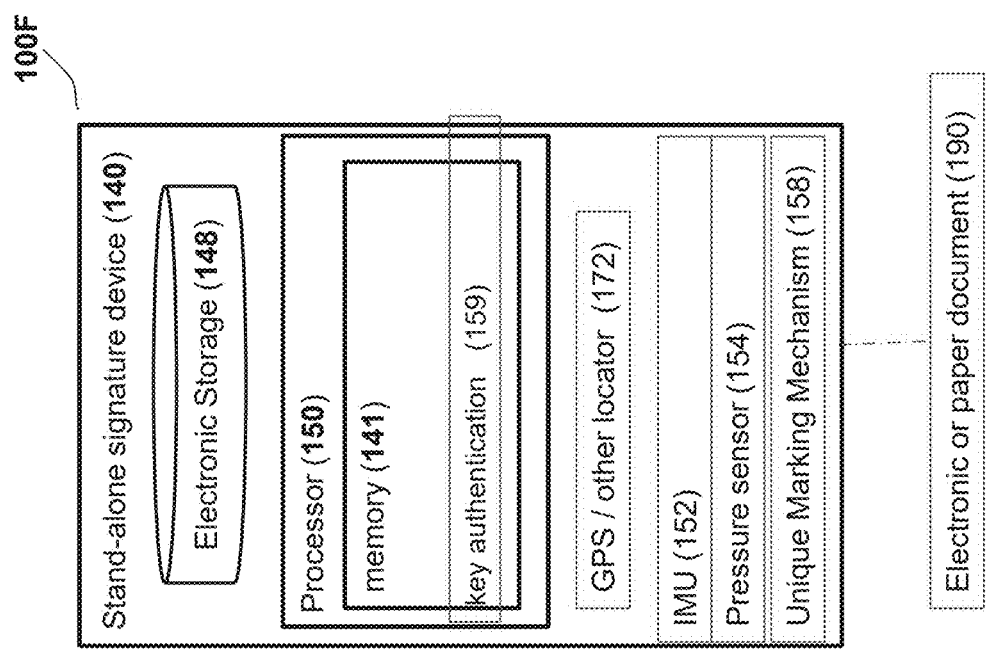
FIG. 1F shows a non-limiting exemplary embodiment, featuring a stand-alone device.

FIG. 1F shows a non-limiting exemplary embodiment, featuring a stand-alone device, shown as a system 100F. Stand-alone signature device 140 is able to operate under conditions of Intermittent network connectivity. For example, stand-alone signature device 140 preferably features key authentication 159, which is preferably preloaded. Key authentication 159 preferably enables the signature of the user to be analyzed and authenticated in advance. For example, key authentication 159 may include one or more authorized uses of stand-alone signature device 140 for a signature to be applied. After the preloaded number of authorized uses has been consumed through use and/or after a predetermined period of time has elapsed, optionally no further signatures may be applied until recharging. Stand-alone signature device 140 may also be used under conditions of Bluetooth to a smartphone or other intermittent network connectivity. Optionally, stand-alone signature device 140 may feature a GPS or other locator 172, for example to only permit authorized signatures to be placed within a limited geographical area (for geofencing) and/or to be able to record the signature as having been applied at a particular location. Optionally these results are stored locally, but may also be uploaded to a server during conditions of actual network connectivity.

Figure 1G:
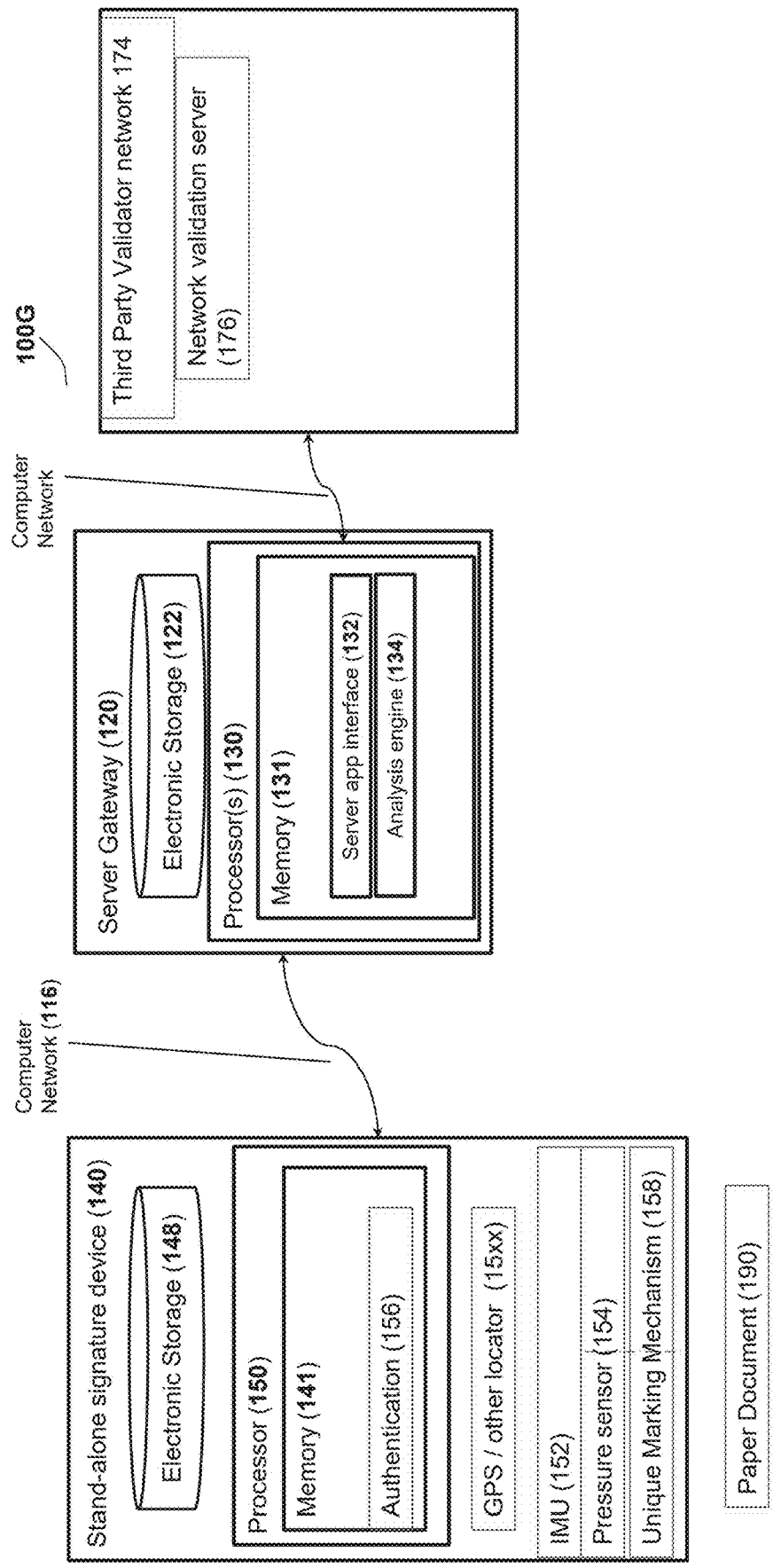
FIG. 1G shows a non-limiting exemplary embodiment, featuring an additional authentication system.

FIG. 1G shows a non-limiting exemplary embodiment, featuring an additional authentication system, shown overall as a system 100G. The additional authentication system may comprise for example a third party validation of physical location and of document. This third party acts as an additional level of security/integrity upon the document. As shown, a third party authentication system 174 may feature a third party authentication server 176. Third party authentication server 176 may comprise a secure NTP (Network Time Protocol) server for example, and may \support the addition at least of a time stamp to the signature results. A NTP server is able to provide an independently verified time stamp or other long term cryptographic signature for a particular action. Optionally third party authentication server 176 stores location verification and optionally also IP address based verification (in which the IP address is stored and is compared to the GPS coordinates).

Figure 1H:
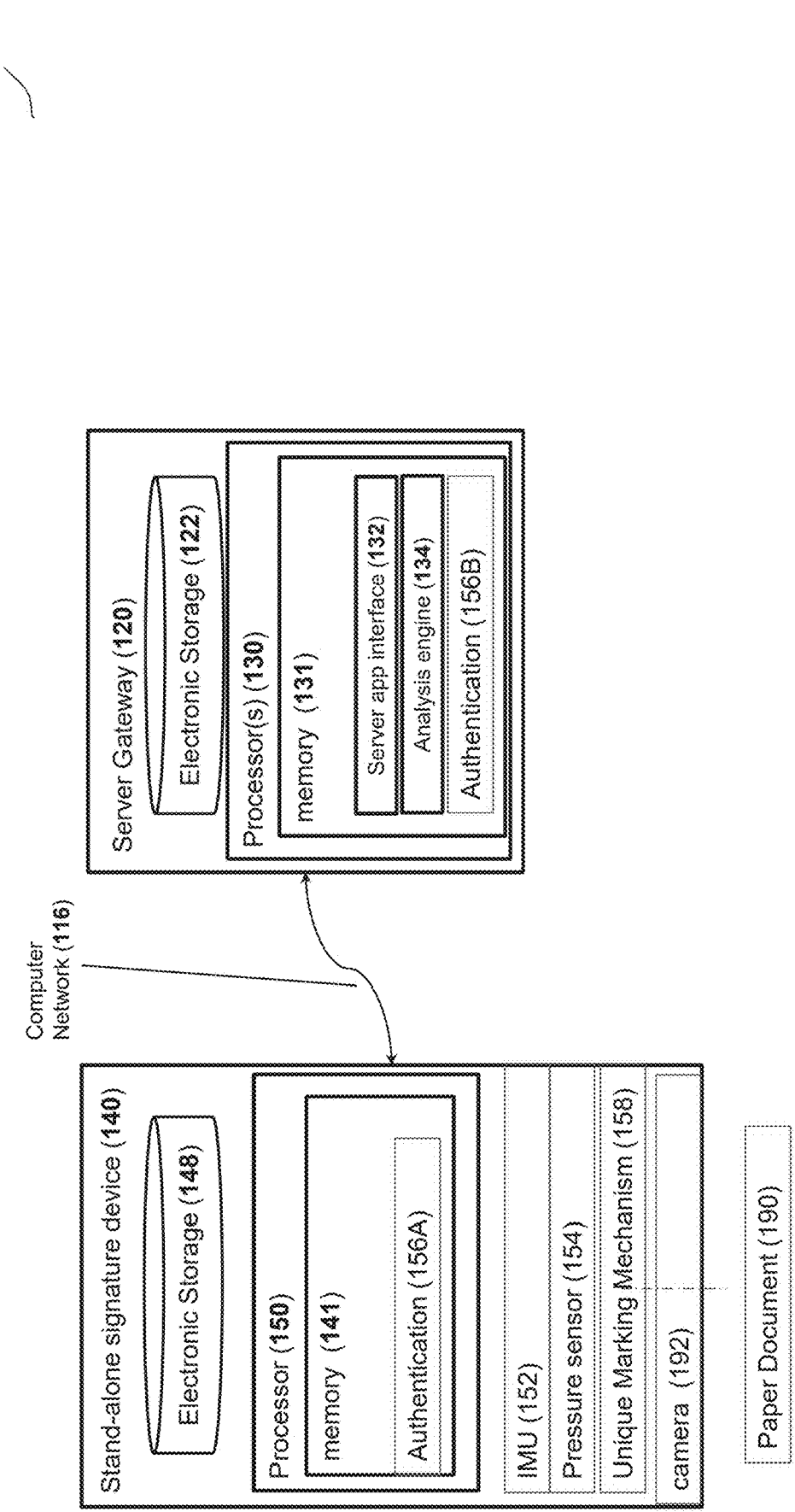
FIG. 1H shows a non-limiting exemplary embodiment, featuring a camera for additional authentication.

FIG. 1H shows a non-limiting exemplary embodiment, featuring a camera for additional authentication, in a system 100H. While any of the above embodiments may feature a camera, system 100H shows an embodiment based on FIG. 1D. Stand-alone signature device 140 comprises a camera 192, which may also, additionally or alternatively, be located separately from stand-alone signature device 140. Camera 192 preferably records still images and/or video data of the signature being applied to paper document 190. Camera 192 may also record the visual identity of the person signing, including without limitation the face and/or hands of the person signing, confirmation that the person is signing without coercion, and potentially a witness or notary to the signature. Stand-alone signature device 140 may then store the results of camera 192 as part of the authentication of the signature. Such camera data may also be transmitted to server gateway 120. The camera data may also be sent to authentication 156A and/or 156B for authentication of the signature.

Figure 2A:
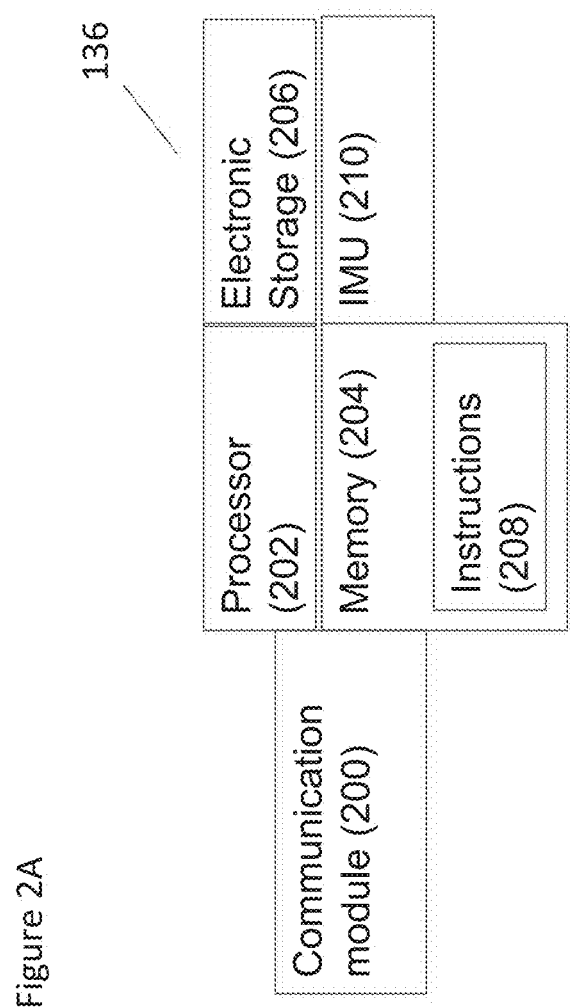
FIG. 2A shows a non-limiting exemplary electronic signature device as shown in FIG. 1C.
Figure 2B:
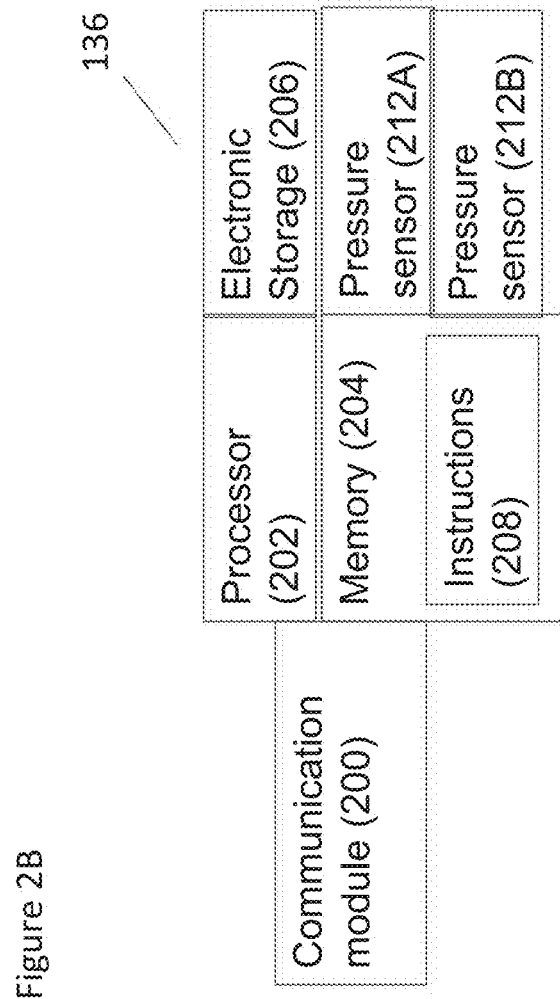
FIG. 2B shows the non-limiting exemplary additional implementation of the electronic signature device as shown in FIG. 1A.
Figure 2C:
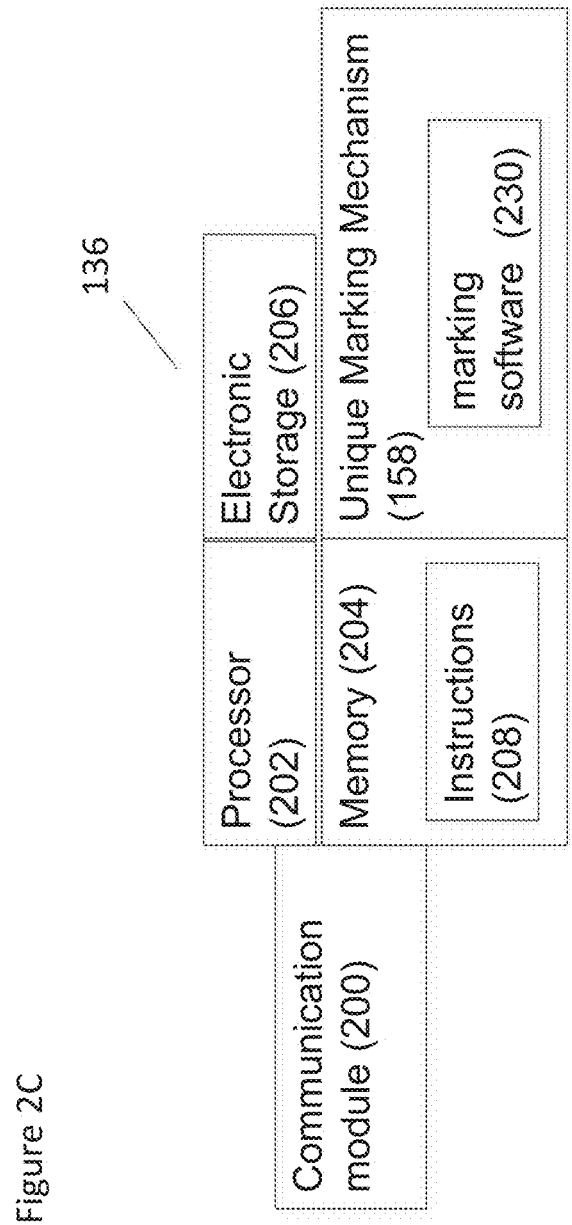
FIG. 2C shows the non-limiting exemplary additional implementation of the electronic signature device as shown in FIG. 1D.

FIGS. 2A-2C show at least portions of non-limiting exemplary electronic signature devices. Components with the same reference number have the same or at least similar functions. FIG. 2A shows a portion of a non-limiting exemplary electronic signature device as shown in FIG. 1C. The electronic signature device 136 is shown comprising a communication module 200 to enable communication with a user computational device 102. In addition, the electronic signature device 136 preferably comprises a processor 202 and a memory 204.

The memory 204 provides instructions 208. These instructions 208 may be provided as firmware which may be rewritable, or alternatively, may be only written once and read many times. Instructions 208 preferably comprise instructions for analyzing touchpoint detection data and then providing authentication. Optionally, the electronic storage 206 provides for additional instructions or additional data for example, for storing one or more indicia or signatures, which are then associated with the electronic signature device 136.

In this implementation, the electronic signature device 136 features in IMU 210, as previously described, for providing information relation to orientation and acceleration in order to indicate that a signature has actually been performed. Such information is preferably analyzed according to instructions 208 to provide touchpoint detection data. The fact that a signature is registered and performed may then be analyzed through instructions 208 through processor 202 and the information sent to the user computational device not shown through communication module 200.

FIG. 2B shows the non-limiting exemplary additional implementation of the electronic signature device 136 as shown in FIG. 1A. As shown, FIG. 2B replaces the IMU with a pressure sensor 212A and a pressure sensor 212B, preferably a plurality of such pressure sensors 212 are shown, including at least two but optionally three or more pressure sensors 212. Each pressure sensor registers pressure when the electronic signature device 136 is pressed against the document, whether the document is in solid physical form, for example paper, or alternatively in electronic form as an electronic document; thereby, indicating that the act of signing has occurred.

FIG. 2C shows the non-limiting exemplary additional implementation of the electronic signature device as shown in FIG. 1D. Unique marking mechanism 158 is shown as featuring marking software 230. Marking software 230 is preferably able to perform the actions of the machine codes as previously described, for example to enable the creation of a unique representation of a hanko or chop. Such a representation may be made on a physical document, such as a paper document for example, with a visible mark such as ink for example. Such a representation may also be made on a touchscreen through physically providing a plurality of touchpoints.

Marking software 230 may also comprise the previously described remotely generated, machine readable instruction set in conjunction with or independently of a locally generated, device/time/date/document specific set of details to add a hanko or chop which is unique to the specific document. Such a machine readable instruction set may comprise an AI (artificial intelligence) model as described with regard to FIGS. 5A and 5B. Such a model may also be used in conjunction with electronic signature device 140, for example for authentication and verification of a user's identity, optionally in conjunction with authentication 156A and/or authentication 156B. Such an AI model may also be used for touchpoint detection.

Marking software 230 may also comprise the previously described cryptographic key storage, as part of storing the results of the chop or hanko, and/or the authentication of the user and/or of the chop or hanko.

FIG. 3 shows a non-limiting exemplary flow for enabling the user to authenticate to the electronic signature device 136 and then to sign a document. As shown in the flow 300, the flow begins at 302 when the user authenticates the device. The user may authenticate the device directly as a standalone electronic signature device 140; or alternatively, indirectly, for example, through a user computational device, as shown with regard to FIG. 1A. If authentication fails, then the process ends at 303 when an error is returned.

Upon authentication, the device is calibrated at 304. This calibration process may, for example, include having these perform one or more actions with the device where they are oriented in various ways or pressing it onto a solid substrate—for example, for pressure sensors—in order for the device to be able to register the sensors, confirm that the sensors are working properly, and calibrate the sensors function for later accuracy of measurement. If calibration fails, the process returns an error. If calibration fails, then the process ends at 303 when an error is returned.

Optionally, a signature is downloaded at 306, for example as a file. This download process may occur for example, if the standalone electronic signature device 140 is capable of storing a plurality of signatures, such signatures may be stored events. The device is placed on the signature area of a document at 308 and then the signatures placed at 310, in order for the document to be signed. For example, in the case of a chop or hanko, optionally the device is pressed against a physical substrate, such as solid media including but not limited to paper, or alternatively, such as an electronic document in which case the pressure be placed against the screen. The device may or may not leave a visible mark on the document, and it may or may not provide a signature unique to the document itself, verifying the document as well as the signer. However if the download process fails, then the process ends at 303 when an error is returned.

Next, the signatures are accepted at 312. Whether through a combination of authentic authentication, understand this signature has been placed and accepted or other information. Optionally, for security reasons, the signature may not be stored on the device before use, and then erased from memory of electronic signature device 136 after use, in order to require re-authentication and reconnection to a source of authentication through another remote device, as shown with regard to 314. Authentication may be required each time even if a signature has been previously downloaded. The document is then stored as signed at 316.

FIG. 4 shows another non-limiting exemplary flow with additional details in regard to operation of the electronic signature device. The flow 400 preferably starts with stages 402-406, which may correspond to stages 302-306 of FIG. 3.

At 408, the electronic signature device preferably contacts a physical item, which may comprise a paper document or a touchscreen device as previously described. At 410, sensor data is obtained as the electronic signature device physically contacts the physical item. Such sensor data may include IMU data, camera data, pressure sensors (for receiving information about touchpoint contact with the electronic signature device) and so forth. At 412, the previously described unique marking mechanism preferably provides a mark, which may comprise ink and/or a plurality of touchpoints as appropriate. At 414, the sensor data may be analyzed as described herein, for example for authentication and/or determination of a correct signature, and/or to store the results of the sensor data as part of the stored signature information.

At 416, if the sensor data, authentication and/or other information indicates that the signature is acceptable, then it is accepted. At 418, the signed document is then stored.

Figure 5A:
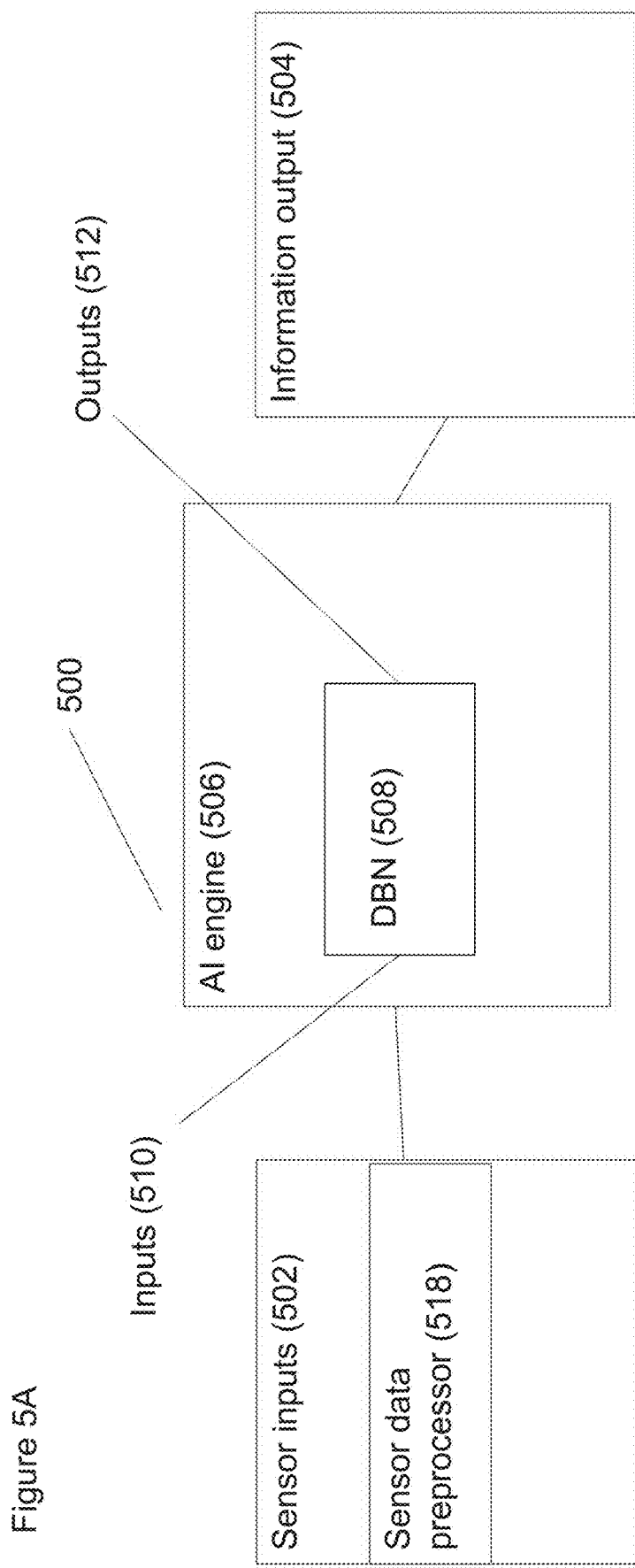
FIGS. 5A and 5B relate to non-limiting, exemplary AI (artificial intelligence) engine systems for use with embodiments as described herein.
Figure 5B:
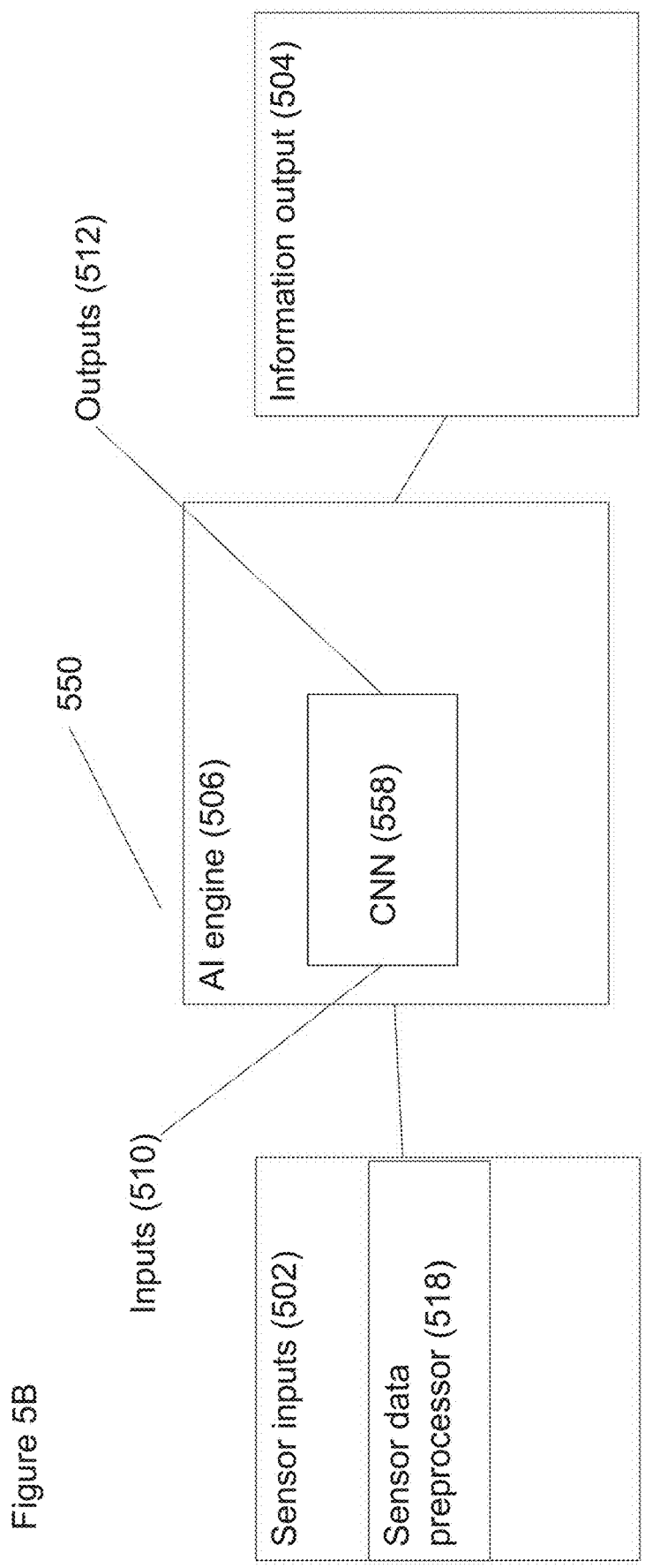

FIGS. 5A and 5B relate to non-limiting, exemplary AI (artificial intelligence) engine systems for use with embodiments as described herein.

Turning now to FIG. 5A as shown in a system 500, sensor inputs are preferably provided at 502. Sensor data preprocessor 518 then preprocesses this data, according to the type of sensor received. Non-limiting examples of sensor data include IMU data, camera data, pressure sensors (for receiving information about touchpoint contact with the electronic signature device) and so forth. The preprocessed sensor data is then fed into an AI engine in 506 and information quality output is provided by the AI engine in 504. In this non-limiting example, AI engine 506 comprises a DBN (deep belief network) 508. DBN 508 features input neurons 510 and neural network 514 and then outputs 512.

A DBN is a type of neural network composed of multiple layers of latent variables ("hidden units"), with connections between the layers but not between units within each layer. The DBN may be used for feature location and analysis, and/or for classification. Regardless of the use, the DBN is appropriate for analyzing sensor data to compare it to a pre-existing pattern and/or to determine a pattern from the sensor data, for example.

FIG. 5B relates to a non-limiting exemplary system 550 with similar or the same components as FIG. 5A, except for the neural network model. In this case, a neural network 562 includes convolutional layers 564, neural network 562, and outputs 512. This particular model is embodied in a CNN (convolutional neural network) 558, which is a different model than that shown in FIG. 5A.

A CNN is a type of neural network that features additional separate convolutional layers for feature extraction, in addition to the neural network layers for classification/identification. Overall, the layers are organized in 3 dimensions: width, height and depth. Further, the neurons in one layer do not connect to all the neurons in the next layer but only to a small region of it. Lastly, the final output will be reduced to a single vector of probability scores, organized along the depth dimension. It is often used for audio and image data analysis, as well as for other types of sensor data analysis.

AI engine 506 preferably supports operation of the electronic signature device as described herein. For example, AI engine 506 may support the operation of the previously described marking software, for example to add a hanko or chop which is unique to the specific document. When adding the hanko or chop, optionally AI engine 506 may operate in conjunction with or independently of a locally generated, device/time/date/document specific set of details. AI engine 506 may also be used for example for authentication and verification of a user's identity, optionally in conjunction with a local and/or server based authentication process. Such an AI model may also be used for touchpoint detection by processing the sensor data as described herein.

Figure 6:
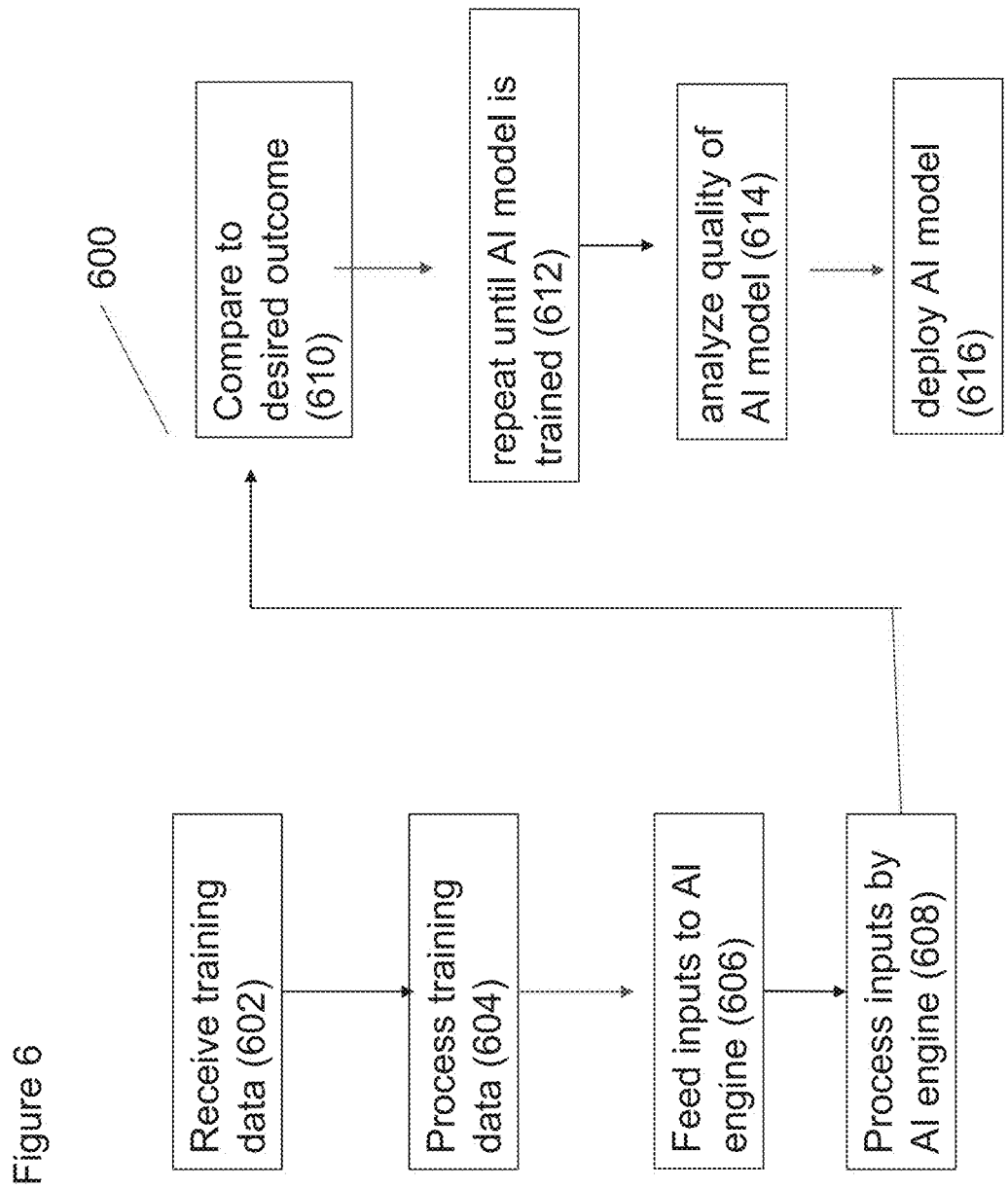
FIG. 6 relates to a non-limiting, exemplary flow for training an AI model as described herein.

FIG. 6 relates to a non-limiting, exemplary flow for training an AI model as described herein. The model may be any suitable AI model as described herein, including without limitation the models shown in FIGS. 5A and 5B. As shown in a method 600, the process begins at 602 when training data is received. The training data preferably comprises the sensor data as previously described. Suitable sensor data may include any sensor data as described herein, including without limitation IMU data, camera data, pressure sensors (for receiving information about touchpoint contact with the electronic signature device) and so forth. The training data is preferably labeled according to the desired outcome for training the model. For example, if it is desired for the AI model to classify images according to an object shown, image data may be labeled according to whether the object is present in the image. Optionally the training data is not labeled. At 604, the training data is preprocessed, to clean up and optionally also for standardization as required. For example, images may be standardized to the same size and shape.

At 606, the training data is fed as inputs to the AI model to be trained. At 608, the inputs are processed by the AI model. At 610, the output of the AI model is compared to a desired outcome. For example, the AI model may receive data comprising a plurality of touchpoint indications, such as pressure sensor data and/or IMU data. The AI model may determine whether the data matches a previously determined pattern, such as an authorized hanko or chop image or pattern, or other signature image or pattern. This process is preferably repeated at 612 until the AI model is trained. At 614, the quality of the analysis by the AI model is preferably determined, such that the AI model is deployed into production only if a certain quality threshold is met in terms of the correct output. At 616, the AI model is deployed.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A hybrid electronic-physical signature device for applying a signature to an electronic or physical document upon authorization of a signing user to be authorized to sign, comprising:
   a) a physical stamp device implemented as a traditional stamp signature device, said physical stamp device comprising touchpoint detection technology for detecting when said physical stamp device is pressed against a surface,
   b) an electronic signature component integrated within said physical stamp device, said electronic signature component including:
      i) a wireless communication module for transmitting signature data; and
      ii) a secure storage for storing cryptographic keys associated with the signing user;
   c) a signature processing system communicatively coupled to said physical stamp device, configured to:
      i) receive a signal from said touchpoint detection technology indicating that said physical stamp device has been pressed against a surface, wherein pressing said physical device against said surface is a signing event;
      ii) apply a physical mark if the surface is a physical document, and to simulate touch input if the surface is an electronic interface;
      iii) if the surface is a physical document: record the application of said physical stamp device to the physical document; and generate an electronic record of the signing event;
      iv) if the surface is an electronic document interface:
      record the application of said physical stamp device to the electronic document interface; and apply an electronic signature to the associated electronic document using the cryptographic keys;
   whereby said hybrid electronic-physical signature device enables a signing user to apply a legally binding signature to both physical and electronic documents using a single traditional signature stamping action, while simultaneously creating verifiable electronic records of all signing events;
   wherein the device further comprises a memory for storing a plurality of instructions and a processor for executing said instructions, wherein said instructions comprise instructions for an electronic signature, wherein the signing user physically manipulates the device to physically touch the document to sign, wherein said touchpoint detection technology detects physically touching the document at a plurality of touchpoints, wherein said touchpoint detection technology comprises a pressure sensor, and wherein said processor receives touchpoint detection data from said pressure sensor to authenticate said signature, wherein said touchpoint detection technology is configured to detect a plurality of pressures physically applied through said physical device on said surface;
   and said hybrid electronic-physical signature device further comprising a camera for recording a visual identity of the signing user.

2. The device of claim 1, wherein the physical medium comprises paper and wherein said device further comprises a unique marking mechanism for leaving a visible or invisible mark upon the medium.

3. The device of claim 1, further comprising an AI (artificial intelligence) model for analyzing said touchpoint detection data according to one or more of an order of application of pressure at said touchpoints on said physical device, and an amount of pressure applied to said physical device at said touchpoints by the signing user, and for authenticating said signature according to said analysis.

4. The device of claim 1, wherein said touchpoint detection technology detects an order and/or relative location of pressure being applied to the touchpoints on the device by the signing user, and/or relative rate at which pressure is applied to the touchpoints by the signing user as the device is brought into contact with the document to be signed.

5. The device of claim 4, wherein said touchpoint detection technology provides data to said processor and said processor executes instructions stored in said memory for detecting an order and/or relative location of the touchpoints, and/or relative rate at which the touchpoints are created as the device is brought into contact with the document to be signed.

6. The device of claim 1, wherein said memory is configured for storing a defined native instruction set of codes and said processor is configured to perform a defined set of basic operations in response to receiving a corresponding basic instruction selected from the defined native instruction set of codes stored in memory; wherein said memory stores a first set of machine codes selected from the native instruction set for receiving touchpoint detection data from said sensor or combination of sensors and a second set of machine codes selected from the native instruction set for analyzing a plurality of touchpoints according to said touchpoint detection data.

7. The device of claim 6, wherein said memory stores a third set of machine codes selected from the native instruction set for receiving said authorization of the signing user and a fourth set of machine codes selected from the native instruction set for applying the electronic signature.

8. The device of claim 1, implemented as a stand-alone device, further comprising at least one pre-loaded key authorization for authorizing said signature, such that said stand-alone device does not require communication through a computer network to authorize said signature.

9. A system comprising the device of claim 1, further adapted to operate in a system for applying an electronic signature to a document upon authorization of a signing user, the system further comprising a user computational device, wherein the document is accessible through said user computational device, and wherein application of the electronic signature is transmitted from the electronic signing device to said user computational device; wherein said user computational device comprises a second memory and a second processor, wherein said second memory is configured for storing a defined native instruction set of codes and said second processor is configured to perform a defined set of basic operations in response to receiving a corresponding basic instruction selected from the defined native instruction set of codes stored in said second memory; wherein said second memory stores a first set of machine codes selected from the native instruction set for receiving touchpoint detection data from the electronic signing device and a second set of machine codes selected from the native instruction set for analyzing a plurality of touchpoints according to said touchpoint detection data; wherein the document comprises a physical medium and wherein said touchpoint detection technology detects physically touching said physical medium; wherein the electronic signing device further comprises an authentication module and said server gateway further comprises an authentication module; wherein the electronic signing device authenticates said application of touchpoints through said authentication module, and wherein said authentication module of said server gateway receives said authentication from the electronic signing device, and determines whether the document is to be stored as having been authentically signed; wherein said user computational device comprises a mobile communication device.

10. The system of claim 9, wherein said second memory stores a third set of machine codes selected from the native instruction set for receiving said authorization of said signing user, wherein said document is not stored as having been authentically signed if said authorization is not received.

11. The system of claim 10, wherein said user computational device further comprises a user app interface and wherein said second memory stores a fourth set of machine codes selected from the native instruction set for operating said user app interface and a fifth set of machine codes selected from the native instruction set for receiving document information from the user through said user app interface.

12. The system of claim 11, further comprising a server gateway and a computer network, wherein said user computational device is in communication with said server gateway through said computer network, wherein said second memory stores a sixth set of machine codes selected from the native instruction set for transmitting such information to said server gateway in regard to a document for signature; wherein said user computational device is in wireless or wired communication with the electronic signing device.

13. The system of claim 11, further comprising a third party integration to establish additional relevant information for one or more of authentication, time, document contents, signatories and other relevant information to a document.

14. The system of claim 12, wherein said server gateway comprises a third processor and a third memory, wherein said third memory is configured for storing a defined native instruction set of codes and said third processor is configured to perform a defined set of basic operations in response to receiving a corresponding basic instruction selected from the defined native instruction set of codes stored in said third memory; wherein said third memory stores a first set of machine codes selected from the native instruction set for receiving document information from said user computational device, a second set of machine codes selected from the native instruction set for receiving signature information from the electronic signing device, whether directly or indirectly, and a third set of machine codes selected from the native instruction set for executing functions of an analysis for determining signature authorization and application to a particular document.

15. The system of claim 14, wherein said user computational device is connected to or integrally formed with the electronic signing device.

16. The system of claim 9, wherein the physical medium comprises a touchscreen device.

17. The system of claim 9, wherein the physical medium comprises paper or another solid non-digital medium.

18. The system of claim 9, further comprising an identification module for identifying the signing user, wherein authorization of the signing user is determined according to an identification of the signing user.

19. A system for applying an electronic signature to a document upon authorization of a signing user to be authorized to sign, comprising the device of claim 1 and further comprising a user computational device, wherein the document is accessible through said user computational device, and wherein application of the electronic signature is transmitted from the device of claim 1 to said user computational device; wherein said user computational device comprises a second memory and a second processor, wherein said second memory is configured for storing a defined native instruction set of codes and said second processor is configured to perform a defined set of basic operations in response to receiving a corresponding basic instruction selected from the defined native instruction set of codes stored in said second memory; wherein said second memory stores a first set of machine codes selected from the native instruction set for receiving touchpoint detection data from the device of claim 1 and a second set of machine codes selected from the native instruction set for analyzing a plurality of touchpoints according to said touchpoint detection data; further comprising an additional authentication system for authenticating a physical location of said stamp and of said document.

20. The device of claim 1, further comprising a key authentication module for enabling said electronic signature to be analyzed and authenticated in advance.

21. The device of claim 20, wherein said key authentication module further comprises a preloaded number of authorized uses, wherein after said authorized uses have been consumed through use, after a predetermined period of time has elapsed, or both, no further signatures may be applied until recharging.

22. The device of claim 1, wherein said touchpoint detection technology further comprises a mechatronic device, a piezoelectric device or a combination thereof, for precise pressure at specific points on the document.

\* \* \* \* \*